United States Patent
Rihn et al.

(10) Patent No.: US 7,384,365 B2
(45) Date of Patent: Jun. 10, 2008

(54) MULTI SPEED TRANSMISSION

(75) Inventors: Matthieu Rihn, Lingolsheim (FR); Herve Schreiber, Obernai (FR)

(73) Assignee: GM Global Technology Operations, Inc., Detroit, MI (US)

( * ) Notice: Subject to any disclaimer, the term of this patent is extended or adjusted under 35 U.S.C. 154(b) by 170 days.

(21) Appl. No.: 11/341,234

(22) Filed: Jan. 27, 2006

(65) Prior Publication Data

US 2007/0179009 A1     Aug. 2, 2007

(51) Int. Cl.
*F16H 3/62* (2006.01)

(52) U.S. Cl. .................. 475/286; 475/319; 475/325

(58) Field of Classification Search ............ 475/269, 475/271, 317, 319, 323, 325
See application file for complete search history.

(56) References Cited

U.S. PATENT DOCUMENTS

| | | | |
|---|---|---|---|
| 4,070,927 A | 1/1978 | Polak | 475/286 |
| 4,709,594 A | 12/1987 | Maeda | 475/280 |
| 5,106,352 A | 4/1992 | Lepelletier | 475/280 |
| 5,385,064 A | 1/1995 | Reece | 74/331 |
| 5,497,867 A | 3/1996 | Hirsch et al. | 192/48.91 |
| 5,560,461 A | 10/1996 | Loeffler | 192/53.32 |
| 5,599,251 A | 2/1997 | Beim et al. | 475/275 |
| 5,641,045 A | 6/1997 | Ogawa et al. | 192/53.341 |
| 5,651,435 A | 7/1997 | Perosky et al. | 192/219 |
| 5,975,263 A | 11/1999 | Forsyth | 192/53.32 |
| 6,053,839 A | 4/2000 | Baldwin et al. | 475/281 |
| 6,071,208 A | 6/2000 | Koivunen | 475/275 |
| 6,083,135 A | 7/2000 | Baldwin et al. | 475/276 |
| 6,217,474 B1 | 4/2001 | Ross et al. | 475/269 |
| 6,354,416 B1 | 3/2002 | Eo | 192/53.341 |
| 6,375,592 B1 | 4/2002 | Takahashi et al. | 475/262 |
| 6,422,969 B1 | 7/2002 | Raghavan et al. | 475/276 |
| 6,425,841 B1 | 7/2002 | Haka | 475/275 |
| 6,471,615 B1 | 10/2002 | Naraki et al. | 475/262 |
| 6,558,287 B2 | 5/2003 | Hayabuchi et al. | 475/271 |
| 6,623,397 B1 | 9/2003 | Raghavan et al. | 360/96.5 |
| 6,752,738 B1* | 6/2004 | Martin et al. | 475/276 |
| 6,840,885 B2 | 1/2005 | Yi et al. | 475/276 |
| 2003/0114266 A1* | 6/2003 | Bauer | 475/271 |
| 2007/0004551 A1* | 1/2007 | Andres | 475/275 |

FOREIGN PATENT DOCUMENTS

| | | |
|---|---|---|
| JP | 09-126283 | 5/1997 |
| WO | 03-095865 | 11/2003 |

\* cited by examiner

*Primary Examiner*—Richard W L Ridley
*Assistant Examiner*—Edwin A Young

(57) ABSTRACT

A transmission is provided having a planetary gearset having respective first, second, and third members, and a compound gearset having respective first, second, third, fourth, and fifth members. The transmission also includes a plurality of selectively engageable torque transmitting devices configured to selectively interconnect selected members of the planetary gearset and the compound gearset for unitary rotation thereby to provide a plurality of forward speed ratios and at least one reverse speed ratio between an input member and an output member.

8 Claims, 1 Drawing Sheet

| | C1 | C2 | C3 | C4 | C5 | C6 | C7 | RATIO | STEP |
|---|---|---|---|---|---|---|---|---|---|
| 1 | X | | X | X | | | | 5.013 | |
| 2 | X | | X | | X | | | 2.900 | 1.729 |
| 3 | X | | X | | | X | | 1.864 | 1.556 |
| 4 | X | | X | | | | X | 1.349 | 1.381 |
| 5 | X | | | | | X | X | 1.000 | 1.349 |
| 6 | X | | | | X | | X | 0.805 | 1.243 |
| 7 | | X | | | | X | X | 0.730 | 1.103 |
| R | | X | X | X | | | | -4.508 | |

US 7,384,365 B2

MULTI SPEED TRANSMISSION

TECHNICAL FIELD

This invention relates to power transmissions having a planetary gear arrangement and a Ravigneaux-style gear arrangement.

BACKGROUND OF THE INVENTION

Passenger vehicles include a powertrain that is comprised of an engine, a multi-speed transmission, and a differential or final drive. The multi-speed transmission increases the overall operating range of the vehicle by permitting the engine to operate through its torque range a number of times. The number of forward speed ratios that are available in the transmission determines the number of times the engine torque range is repeated. Early automatic transmissions had two speed ranges. This severely limited the overall speed range of the vehicle and therefore required a relatively large engine that could produce a wide speed and torque range. This resulted in the engine operating at a specific fuel consumption point other than the most efficient point during cruising. Therefore, manually-shifted (countershaft transmissions) were the most popular.

With the advent of three- and four-speed automatic transmissions, the automatic shifting (planetary gear) transmission increased in popularity with the motoring public. These transmissions improved the operating performance and fuel economy of the vehicle. The increased number of speed ratios reduces the step size between ratios and therefore improves the shift quality of the transmission by making the ratio interchanges substantially imperceptible to the operator under normal vehicle acceleration.

It has been suggested that the number of forward speed ratios be increased to six or more. Six-speed transmissions are disclosed in U.S. Pat. No. 4,070,927 issued to Polak on Jan. 31, 1978; and U.S. Pat. No. 6,422,969 issued to Raghavan and Usoro on Jul. 23, 2002.

Six-speed transmissions offer several advantages over four- and five-speed transmissions, including improved vehicle acceleration and improved fuel economy. While many trucks employ power transmissions having six or more forward speed ratios, passenger cars are still manufactured with three- and four-speed automatic transmissions and relatively few five or six-speed devices due to the size and complexity of these transmissions.

Seven-speed transmissions are disclosed in U.S. Pat. No. 6,623,397 issued to Raghavan, Bucknor and Usoro. Eight speed transmissions are disclosed in U.S. Pat. No. 6,425,841 issued to Haka. The Haka transmission utilizes three planetary gear sets and six torque transmitting devices, including two brakes and two clutches, to provide eight forward speed ratios and a reverse speed ratio. One of the planetary gear sets is positioned and operated to establish two fixed speed input members for the remaining two planetary gear sets. Seven-, eight- and nine-speed transmissions provide further improvements in acceleration and fuel economy over six-speed transmissions. However, like the six-speed transmissions discussed above, the development of seven-, eight-and nine-speed transmissions has been precluded because of complexity, size and cost.

SUMMARY OF THE INVENTION

A transmission is provided having an input member, an output member, and a stationary member. A planetary gearset includes respective first, second, and third members. A compound gearset includes respective first, second, third, fourth, and fifth members. The first member of the planetary gearset is continuously operatively connected to the input member for unitary rotation therewith. The first member of the compound gearset is continously operatively connected to the output member for unitary rotation therewith.

The transmission further includes first, second, third, fourth, fifth, sixth, and seventh torque transmitting devices being operative to selectively connect members of the planetary gearset and the compound gearset with the stationary member or with other members of the planetary gearset or the compound gearset to provide at least seven forward speed ratios and a reverse speed ratio.

The above features and advantages and other features and advantages of the present invention are readily apparent from the following detailed description of the best modes for carrying out the invention when taken in connection with the accompanying drawings.

DESCRIPTION OF THE PREFERRED EMBODIMENT

Figures 1, 2:
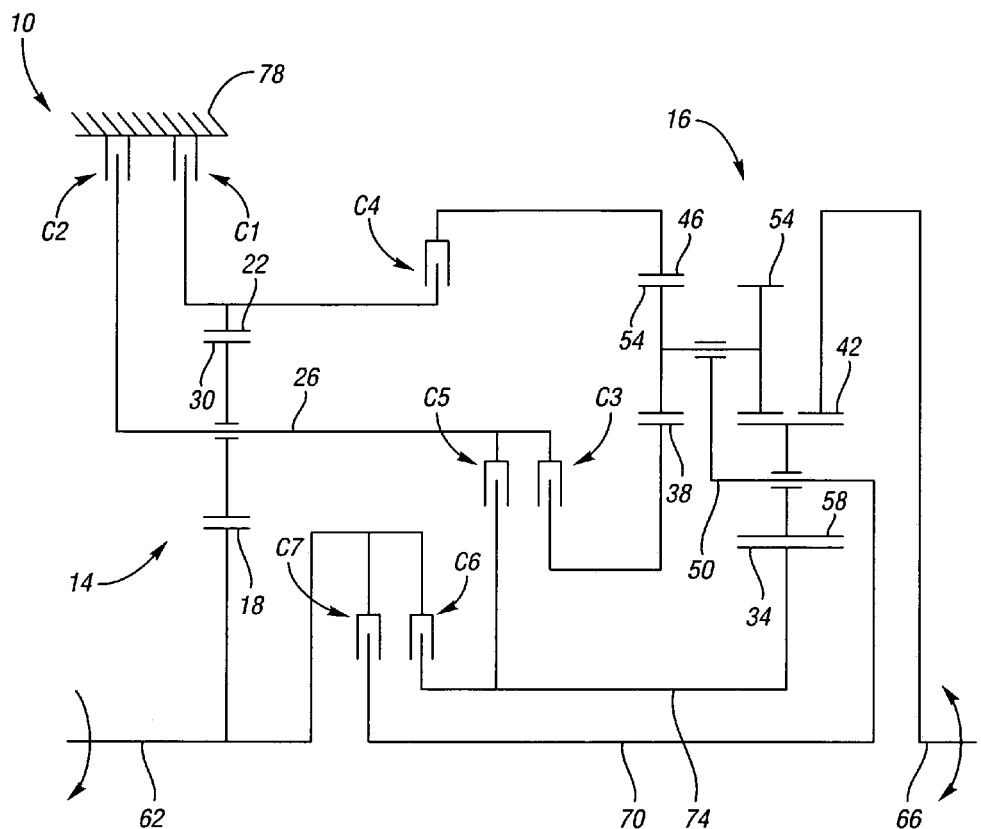
FIG. 1 is a schematic representation of a transmission in accordance with the present invention.
FIG. 2 is a ratio chart and truth table depicting a shift logic for use with the transmission of FIG. 1.

Referring to FIG. 1, a transmission 10 for a vehicle is schematically depicted. The transmission 10 includes a planetary gearset 14 and a compound gearset 16. Planetary gearset 14 includes a sun gear member 18, a ring gear member 22, and a planet carrier member 26. Planet carrier member 26 rotatably supports a planetary pinion gear member 30, which is meshingly engaged with ring gear member 22 and with sun gear member 18.

Compound gearset 16 includes sun gear member 34, sun gear member 38, ring gear member 42, ring gear member 46, and planet carrier member 50. Planet carrier member 50 rotatably supports planetary pinion member 54 and planetary pinion member 58. Planetary pinion member 54 is meshingly engaged with sun gear member 38 and with ring gear member 46. Planetary pinion member 58 is meshingly engaged with sun gear member 34, ring gear member 42, and planetary pinion member 54. Compound gearset 16 is a Ravigneaux gearset in which long pinion 54 does not belong to the same kinematic chain between the sun gear 34 and the ring gear 42.

It should be noted that, where used in the claims, first, second, third, fourth, and fifth members of planetary or compound gearsets do not necessarily refer to a member of a particular type; thus, for example, a first member may be any one of a ring gear member, sun gear member, or planet carrier member.

The transmission includes an input member such as input shaft 62. Input shaft 62 is continuously connected to sun gear member 18 for unitary rotation therewith. Input shaft 62 is connectable to the output member of an engine (not shown) such as a crankshaft, either directly or through a torque converter (not shown). An output member, such as output shaft 66, is continuously connected to ring gear member 42 for unitary rotation therewith. Output shaft 66 is connectable to a vehicle final drive system (not shown) to drive vehicle wheels (not shown) or other tractive device. Shaft 70 is continuously connected to planet carrier member 50 for unitary rotation therewith. Sleeve 74 is concentrically positioned around shaft 70, and is continuously connected to sun gear member 34 for unitary rotation therewith.

The transmission 10 includes a plurality of selectively engagable torque-transmitting devices, or clutches, C1-C7. Clutch C1 is a brake that is selectively engageable to ground ring gear member 22 to a stationary member such as the transmission housing 78. Clutch C2 is a brake that is selectively engageable to ground planet carrier member 26 to transmission housing 78. Clutch C3 is selectively engageable to couple planet carrier member 26 to sun gear member 38 for unitary rotation therewith. Clutch C4 is selectively engageable to couple ring gear member 22 to ring gear member 46 for unitary rotation therewith. Clutch C5 is selectively engageable to couple planet carrier member 26 to sleeve 74 and sun gear member 34 for unitary rotation. Clutch C6 is selectively engageable to couple the input shaft 62 and sun gear member 18 to sleeve 74 and sun gear member 34 for unitary rotation. Clutch C7 is selectively engageable to couple input shaft 62 and sun gear member 18 to shaft 70 and planet carrier member 50 for unitary rotation.

An electronic control unit (not shown) is preferably employed to control the engagement of the torque transmitting devices C1-C7 via hydraulic actuation in a manner understood by those skilled in the art.

Referring to FIG. 2, a shift logic sequence for clutches C1-C7 is depicted that provides seven forward speed ratios and one reverse speed ratio between the input member 62 and the output member 66. Referring to FIGS. 1 and 2, a first forward speed ratio is achieved when clutches C1, C3, and C4 are engaged. A second forward speed ratio is achieved when clutches C1, C3, and Cs are engaged. A third forward speed ratio is achieved when clutches C1, C3, and C6 are engaged. A fourth forward speed ratio is achieved when clutches C1, C3, and C7 are engaged. A fifth forward speed ratio is achieved when clutches C1, C7, and C6 are engaged. A sixth forward speed ratio is achieved when clutches C1, C7, and CS are engaged. A seventh forward speed ratio is achieved when clutches C2, CS, and C7 are engaged. A reverse speed ratio is achieved when clutches C2, C3, and C4 are engaged.

It should be noted, as apparent from FIG. 2, that single step speed ratio interchanges between all adjacent forward speed ratios is accomplished by single transition shifting wherein only one clutch is released and only one clutch is engaged to accomplish the speed ratio shift. It should be further noted that the planetary gearset generates underdrive ratios in the first speed ratio through the sixth speed ratio.

While the best mode for carrying out the invention has been described in detail, those familiar with the art to which this invention relates will recognize various alternative designs and embodiments for practicing the invention within the scope of the appended claims.

The invention claimed is:

1. A transmission comprising:
an input member; an output member; a stationary member;
a planetary gearset having respective first, second, and third members;
a compound gearset having respective first, second, third, fourth, and fifth members;
said first member of said planetary gearset being continuously operatively connected to said input member for unitary rotation therewith;
said first member of said compound gearset being continuously operatively connected to said output member for unitary rotation therewith;
first, second, third, fourth, fifth, sixth, and seventh torque transmitting devices being operative to selectively connect members of said planetary gearset and said compound gearset with said stationary member or with other members of said planetary gearset or said compound gearset to provide at least seven forward speed ratios;
wherein said first torque transmitting device is configured to selectively couple said second member of said planetary gearset with said stationary member;
wherein said second torque transmitting device is configured to selectively couple said third member of said planetary gearset with said stationary member;
wherein said third torque transmitting device is configured to selectively couple said second member of said compound gearset with said third member of said planetary gearset for unitary rotation;
wherein said fourth torque transmitting device is configured to selectively couple said second member of said planetary gearset and said third member of said compound gearset for unitary rotation;
wherein said fifth torque transmitting device is configured to selectively couple said third member of said planetary gearset and said fourth member of said compound gearset for unitary rotation;
wherein said sixth torque transmitting device is configured to selectively couple said input member and said first member of said planetary gearset with said fourth member of said compound gearset for unitary rotation; and
wherein said seventh torque transmitting device is configured to selectively couple said input member and said first member of said planetary gearset with said fifth member of said compound gearset for unitary rotation.

2. The transmission of claim 1, wherein said compound gearset includes a first sun gear member, a second sun gear member, a first ring gear member, a second ring gear member; a first planet carrier member, a first planetary pinion member rotatably connected with respect to the first planet carrier member and meshingly engaged with said first sun gear member and said second ring gear member, and a second planetary pinion member rotatably connected with respect to the first planet carrier member and meshingly engaged with said second sun gear member, said first planetary pinion member, and said first ring gear member.

3. The transmission of claim 2, wherein said first member of said compound gearset is said first ring gear member; wherein said second member of said compound gearset is said first sun gear member; wherein said third member of said compound gearset is said second ring gear member; wherein said fourth member of said Ravigneaux gearset is said second sun gear member; and wherein said fifth member of said planetary gearset is said first planet carrier member.

4. The transmission of claim 3, wherein said planetary gearset includes a third sun gear member, a third ring gear member, and a second planet carrier member; and wherein said first member of said planetary gearset is said third sun gear member; wherein said second member of said planetary gearset is said third ring gear member; and wherein said third member of said planetary gearset is said second planet carrier member.

5. The transmission of claim 1, wherein single step speed ratio interchanges between adjacent forward speed ratios are accomplished as single transition interchanges.

6. A transmission comprising:

an input member; an output member; a stationary member;

a planetary gearset including a first sun gear member, a first ring gear member, and a first planet carrier member;

a compound gearset including a second sun gear member, a third sun gear member, a second ring gear member, a third ring gear member; a second planet carrier member, a first planetary pinion member rotatably connected with respect to the second planet carrier member and meshingly engaged with said second sun gear member and said second ring gear member, and a second planetary pinion member rotatably connected with respect to the second planet carrier member and meshingly engaged with said third sun gear member, said first planetary pinion member, and said third ring gear member;

said first sun gear member being continuously operatively connected to said input member; said third ring gear member being continuously operatively connected to said output member; and first, second, third, fourth, fifth, sixth, and seventh torque transmitting devices being operative to selectively connect members of said planetary gearset and said compound gearset with said stationary member or with other members of said planetary gearset or said compound gearset to provide at least seven forward speed ratios.

7. The transmission of claim 6, wherein said first torque transmitting device is configured to selectively couple said first ring gear member with said stationary member; wherein said second torque transmitting device is configured to selectively couple said first planet carrier member with said stationary member; wherein said third torque transmitting device is configured to selectively couple said first planet carrier member and said second sun gear member for unitary rotation; wherein said fourth torque transmitting device is configured to selectively couple said first ring gear member and said second ring gear member for unitary rotation; wherein said fifth torque transmitting device is configured to selectively couple said first planet carrier member and said third sun gear member for unitary rotation; wherein said sixth torque transmitting device is configured to selectively couple said input member and said first sun gear member with said third sun gear member for unitary rotation; and wherein said seventh torque transmitting device is configured to selectively couple said input member and said first sun gear member with said second planet carrier member for unitary rotation.

8. A transmission comprising:

an input member; an output member; a stationary member;

a planetary gearset including a first sun gear member, a first ring gear member, and a first planet carrier member;

a compound gearset including a second sun gear member, a third sun gear member, a second ring gear member, a third ring gear member; a second planet carrier member, a first planetary pinion member rotatably connected with respect to the second planet carrier member and meshingly engaged with said second sun gear member and said second ring gear member, and a second planetary pinion member rotatably connected with respect to the second planet carrier member and meshingly engaged with said third sun gear member, said first planetary pinion member, and said third ring gear member;

said first sun gear member being continuously operatively connected to said input member; said third ring gear member being continuously operatively connected to said output member;

a first torque transmitting device being configured to selectively couple said first ring gear member with said stationary member; a second torque transmitting device being configured to selectively couple said first planet carrier member with said stationary member; a third torque transmitting device being configured to selectively couple said first planet carrier member and said second sun gear member for unitary rotation; a fourth torque transmitting device being configured to selectively couple said first ring gear member and said second ring gear member for unitary rotation; a fifth torque transmitting device being configured to selectively couple said first planet carrier member and said third sun gear member for unitary rotation; a sixth torque transmitting device being configured to selectively couple said input member and said first sun gear member with said third sun gear member for unitary rotation; and a seventh torque transmitting device being configured to selectively couple said input member and said first sun gear member with said second planet carrier member for unitary rotation.

\* \* \* \* \*